(12) United States Patent
Chiu et al.

(10) Patent No.: US 8,203,779 B2
(45) Date of Patent: Jun. 19, 2012

(54) READOUT CIRCUIT FOR AN IMAGE SENSOR

(75) Inventors: Boh-Shun Chiu, Tainan (TW); Ping-Hung Yin, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 767 days.

(21) Appl. No.: 12/366,579

(22) Filed: Feb. 5, 2009

(65) Prior Publication Data

US 2010/0194945 A1 Aug. 5, 2010

(51) Int. Cl.
*H04N 5/335* (2006.01)
(52) U.S. Cl. ...................................... 359/300
(58) Field of Classification Search ............ 348/300, 348/250, 257, 294, 358
See application file for complete search history.

(56) References Cited

U.S. PATENT DOCUMENTS

| | | | | | |
|---|---|---|---|---|---|
| 5,781,233 | A | * | 7/1998 | Liang et al. | 348/302 |
| 6,078,643 | A | * | 6/2000 | Vogelsong et al. | 378/98.2 |
| 6,476,864 | B1 | * | 11/2002 | Borg et al. | 348/245 |
| 7,903,086 | B2 | * | 3/2011 | Brosnan | 345/166 |

* cited by examiner

*Primary Examiner* — Ricky Mack
*Assistant Examiner* — Vipin Patel
(74) *Attorney, Agent, or Firm* — Stout, Uxa, Buyan & Mullins, LLP

(57) ABSTRACT

A readout circuit for an image sensor is disclosed. At least one column amplifier (CA) generates a CA reset signal when the column amplifier is reset. A capacitor and a switch are configured to receive a column of the image sensor. A multiplexer is coupled between (a) the capacitor and the switch and (b) an input of the column amplifier. A correlated double sampling (CDS) circuit is used for controllably receiving an output of the column amplifier.

16 Claims, 5 Drawing Sheets

READOUT CIRCUIT FOR AN IMAGE SENSOR

BACKGROUND OF THE INVENTION

1. Field of the Invention

The present invention generally relates to an image sensor, and more particularly to the readout architecture for an image sensor with horizontal binning function.

2. Description of the Prior Art

Semiconductor based image sensors, such as charge-coupled devices (CCDs) or complementary metal-oxide-semiconductor (CMOS) sensors, are widely used, for example, in cameras or camcorders, to convert images of visible light into electronic signals that can then be stored, transmitted or displayed.

For an image sensor, such as state-of-the-art CMOS image sensor, a column amplifier (CA) is used to correspondingly read out image signals in each column (or bit line). One of the reasons to provide a gain at this early stage of an analog chain is to acquire a better signal-to-noise ratio (SNR). FIG. 1 shows the conventional readout architecture for an image sensor, in which each column (col1, col2, etc.) is correspondingly connected to an associated column amplifier (CA1, CA2, etc.). The signals are then sent, in sequence, to a following programmable gain amplifier (PGA) via a switch network. Specifically, the sample-and-hold reset (SHR) levels in the capacitors ($C_{SHRn}$, n=1, 2, ...) of each column are controllably sent in sequence to the PGA, and the sample-and-hold (image) signals (SHS) in the capacitors ($C_{SHSn}$, n=1, 2, ...) of each column are controllably sent in sequence to the PGA.

As more pixels (or photodiodes) are manufactured in an image sensor, the area, and thus the associated intensity, of each pixel become smaller. Accordingly, the signals from two or more pixels are sometimes added up (commonly called "binning") to enhance the intensity so as to achieve better SNR. FIG. 2 shows the conventional readout architecture for an image sensor with binning function, in which each column (col1, col2, etc.) is correspondingly connected to an associated column amplifier (CA1, CA2, etc.). Before the signals are sent to the following PGA, the signals of a desired number of binning columns are added up (or binned) via multiplexers (MUXs). The outputs of the multiplexers (MUXs) are then sent, in sequence, to the PGA via a switch network. As the signal binning is performed in a column-wise manner, the binning technique shown in FIG. 2 is commonly referred to as a horizontal binning technique.

Accordingly, it is observed that the conventional readout architecture for an image sensor, for example, as shown in FIG. 1 requires a relatively large number of column amplifiers (CAs) and, thus, a relatively large chip area. As the number of columns increases, the number of CAs consequently increases, thereby occupying a substantial portion of the chip. It is also observed that, in the conventional readout architecture for an image sensor with binning function as shown in FIG. 2, the signal binning performed after the CAs disadvantageously affects the SNR.

For the reason that conventional readout architectures for the image sensor suffer a variety of disadvantages, a need has arisen to propose a novel readout architecture for an image sensor to improve the SNR and reduce chip area.

SUMMARY OF THE INVENTION

In view of the foregoing, it is an object of the present invention to provide a readout architecture for an image sensor, particularly with the horizontal binning function, for improving the signal-to-noise ratio (SNR) and reducing chip area.

According to one exemplary embodiment, the readout circuit for an image sensor includes a column amplifier, and a number of pairs each including a capacitor and a switch configured to receive one column of the image sensor respectively. The readout circuit also includes a multiplexer coupled between (a) the capacitor and the switch pairs and (b) an input of the column amplifier, and a correlated double sampling (CDS) circuit for controllably receiving an output of the column amplifier. The readout circuit further includes a switch network configured to send outputs of the CDS circuit in sequence, and an amplifier coupled to receive outputs of the switch network.

DETAILED DESCRIPTION OF THE INVENTION

Figure 3:
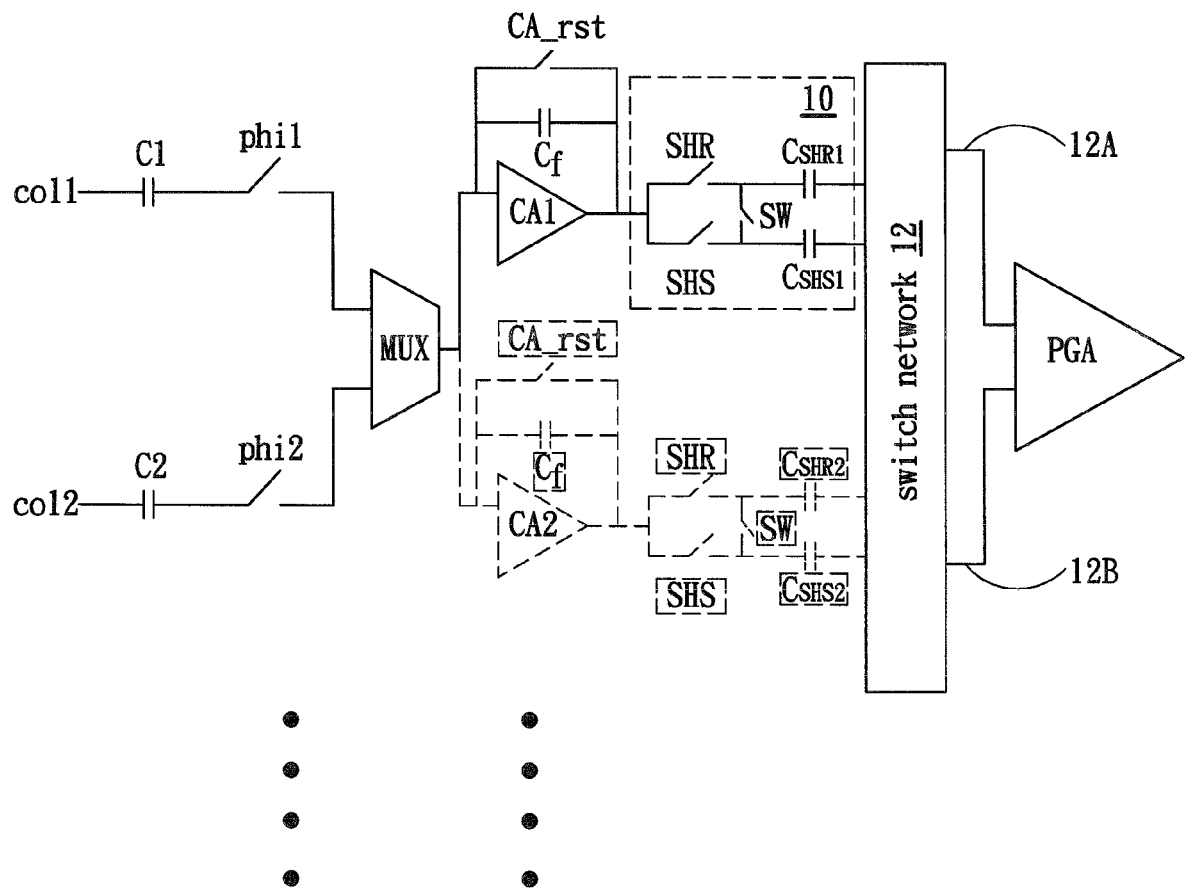
FIG. 3 shows readout architecture for an image sensor with horizontal binning function according to one embodiment of the present invention.

FIG. 3 shows readout architecture for an image sensor with horizontal binning function according to one embodiment of the present invention. The image sensor may be, but is not limited to, a charge-coupled device (CCD) or complementary metal-oxide-semiconductor (CMOS) sensor for converting images of visible light into electronic signal. The disclosed readout architecture may be generally applied in digital image processing devices, such as, but not limited to, cameras or camcorders.

In the embodiment, each of the columns (col1, col2, etc.) or bit lines of the image sensor is electrically coupled to the input of a multiplexer MUX via a capacitor Cn and a switch phin (n=1, 2, etc.). In this specification, the transistors (or switches) and the associated control signals use the same reference characters. The capacitor Cn is coupled to the column (coln, n=1, 2, etc.) at one plate, and the switch phin (n=1, 2, etc.) is coupled between the second plate of the capacitor Cn and the input of the multiplexer MUX. The multiplexer MUX may be configured to add up (or bin) the signals from a desired number of the columns (col1, col2, etc.). In another embodiment, however, the multiplexer MUX may additionally or alternatively facilitate a non-binning operation.

Figure 1:
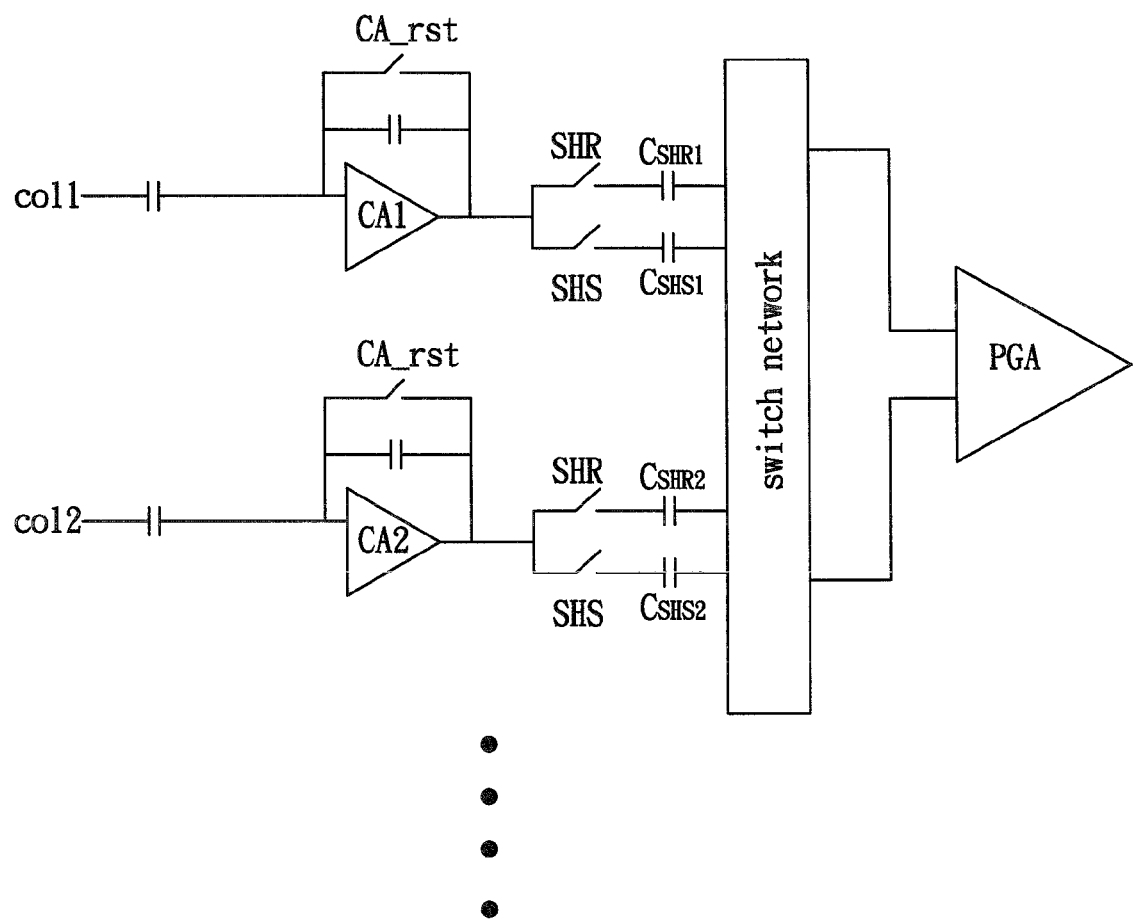
FIG. 1 shows the conventional readout architecture for an image sensor.
Figure 2:
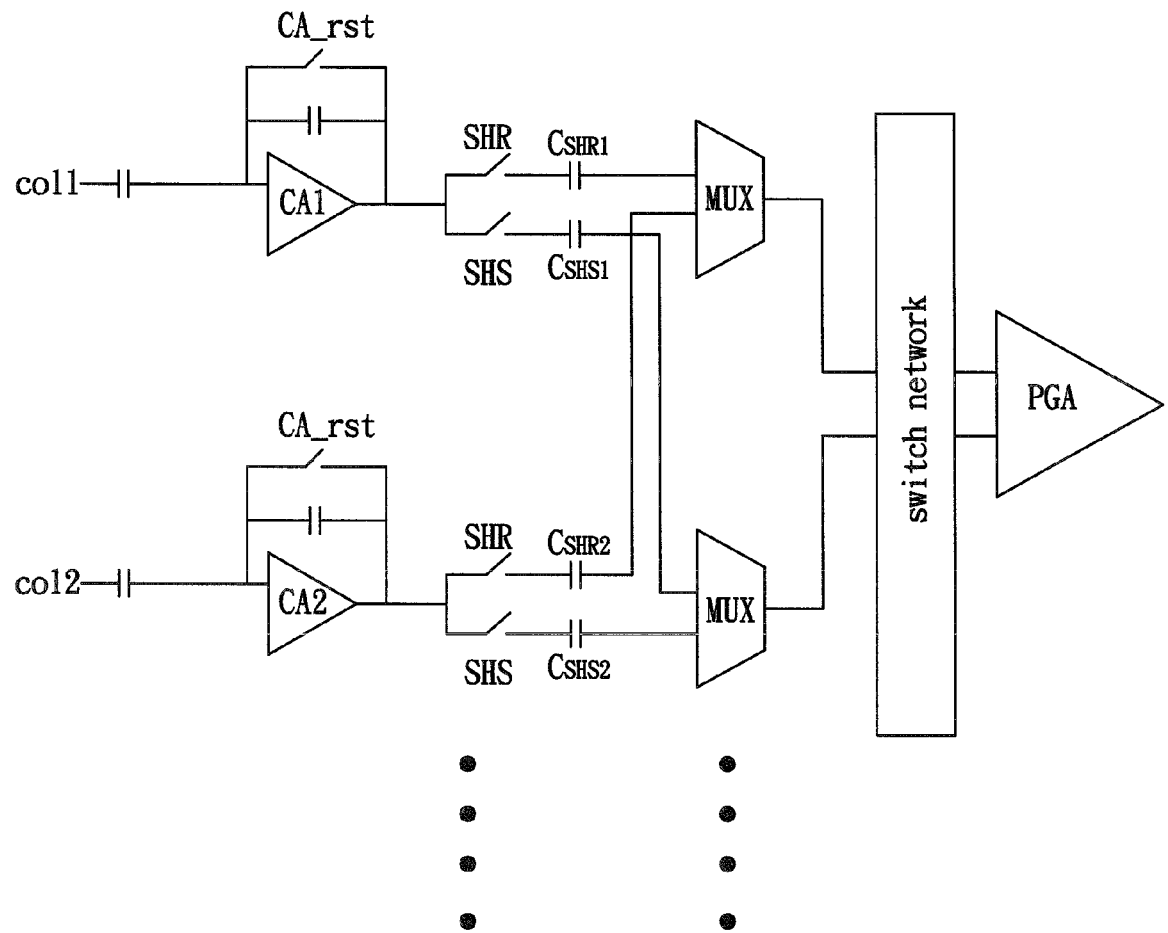
FIG. 2 shows the conventional readout architecture for an image sensor with binning function.

The output of the multiplexer MUX is fed to a column amplifier CA1. The single column amplifier CA1 is preferably used in one embodiment, instead of using further column amplifiers (CAn, n=2, 3, etc.) as in the conventional readout architectures shown in FIG. 1 and FIG. 2. Accordingly, substantial chip area may be saved. In an alternative embodiment, the column amplifiers CAn (n=2, 3, etc.) as indicated by the dashed lines in FIG. 3 may also be used. The column amplifier CA is preferably a single-ended amplifier.

Referring back to FIG. 3, a feedback capacitor $C_f$ is coupled between the output and the input of the column amplifier (e.g., CA1). A CA-reset switch CA_rst is also coupled between the output and the input of the column amplifier CA1.

A correlated double sampling (CDS) circuit 10, consisting of a sample-and-hold-reset_signal (SHR) switch and a sample-and-hold-image_signal (SHS) switch, receives output of the column amplifier CA1. The SHR switch and the SHS switch are coupled to a SHR capacitor $C_{SHR}$ and a SHS capacitor $C_{SHS}$ respectively. The single CDS circuit 10 is preferably used in one embodiment, instead of using further CDS circuits as in the conventional readout architectures shown in FIG. 1 and FIG. 2. Accordingly, substantial chip area may be saved. In an alternative embodiment, the CDS circuits as indicated by the dashed lines in FIG. 3 may also be used.

Subsequently, the signals are sent, in sequence, to a following amplifier, such as a programmable gain amplifier (PGA). The PGA is preferably a differential amplifier. Specifically, the sample-and-hold reset (SHR) levels in the SHR capacitor $C_{SHR}$ are controllably sent in sequence, via a switch network 12, to the PGA through a first path 12A, and the sample-and-hold (image) signals (SHS) in the SHS capacitor $C_{SHS}$ are controllably sent in sequence, via the switch network 12, to the PGA through a second path 12B. The CDS circuit 10 may further include a switch SW, which is closed when the signals in the SHR $C_{SHR}$ capacitor and the SHS capacitor $C_{SHS}$ are forwarded to the following amplifier (for example, PGA) after the completion of the binning operation.

Figures 4A, 4B:
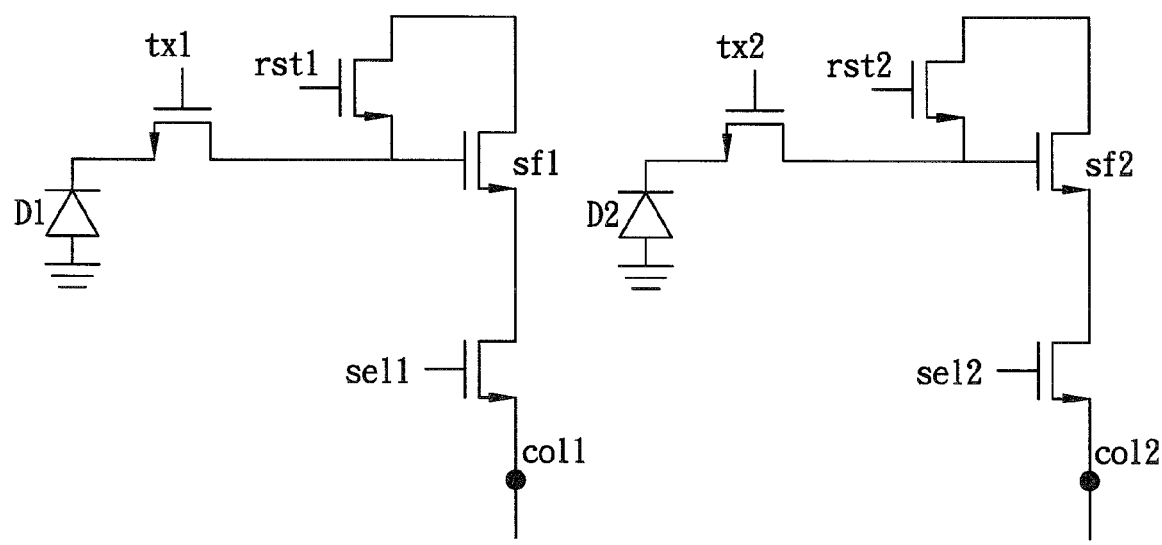
FIG. 4A shows a pixel circuit for the first column of the image sensor.
FIG. 4B shows a pixel circuit for the second column of the image sensor, according to one embodiment of the present invention.

FIG. 4A shows a pixel circuit for the first column of the image sensor, and FIG. 4B shows a pixel circuit for the second column of the image sensor, according to one embodiment of the present invention. The pixel circuit of the image sensor includes a reset transistor rstn (n=1, 2), a source follower transistor sfn (n=1, 2), a selector transistor seln (n=1, 2), and a transfer transistor txn (n=1, 2). Specifically, the reset transistor rstn, when it is turned on, is used to reset the photodiode Dn (n=1, 2) to a reset reference voltage. The source follower transistor sfn, when it is turned on, is used to buffer the image signals of the photodiode Dn. The selector transistor seln, when it is turned on by a word line, allows the readout of the pixel image signal. The transfer transistor txn, when it is turned on, is used to transfer the pixel image signal of the photodiode Dn. The pixel circuit provides an output at the column coln (n=1, 2), which is then coupled to the input of the readout circuit in FIG. 3.

Figure 5:
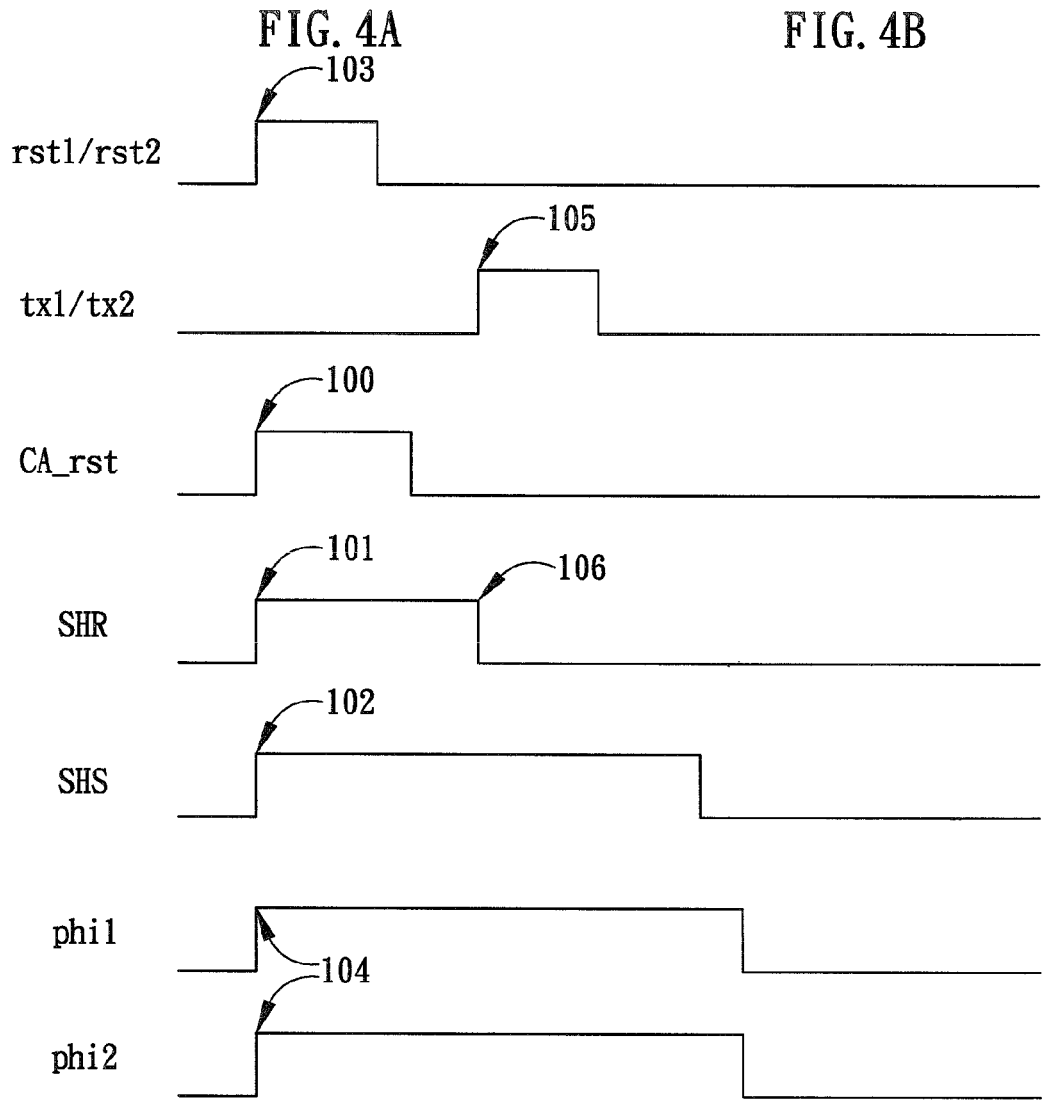
FIG. 5 shows a timing diagram of the corresponding signals in FIGS. 3, 4A and 4B in the binning mode.

FIG. 5 shows a timing diagram of the corresponding signals in FIGS. 3, 4A and 4B in the binning mode. In the operation, first, the CA reset switch CA_rst is closed (100) to reset the column amplifier CA1. The SHR switch is closed (101) such that the CA reset signal is stored in the SHR capacitor $C_{SHR}$. In this phase, the SHS switch is also closed (102). The overlapping duration of the active SHR signal and the SHS signal is in practice arranged to prevent coupling effects. In an alternative embodiment, the SHS switch is open in this phase. At the same time, the reset transistor rstn is turned on (103). The output reset signal of the pixel circuit (FIG. 4A, 4B) is then received and stored in the capacitor Cn (n=1, 2) by closing the switch phin (n=1, 2) (104).

Subsequently, the transfer transistor txn of the pixel circuit (FIG. 4A, 4B) is turned on (105). Accordingly, the voltage at the input of the column amplifier CA is equal to the image signal minus the stored reset signal, and is then transmitted through and amplified by the column amplifier CA with the maintained closed SHS switch but open SHR switch (106). Accordingly, the image signal of the image sensor is thus stored in the SHS capacitor $C_{SHS}$. For the binning operation, the multiplexer MUX is configured to add up (or bin) the signals from a desired number of the columns (col1, col2, etc.).

According to the embodiment, as only a single column amplifier CA and a single CDS circuit 10 are preferably utilized, substantial chip area may be saved. In other words, one column amplifier may be reused and shared, by multiplexing, among several columns. Moreover, the pixel binning is performed before the column amplifier CA, and therefore a better SNR may be obtained.

Figure 6:
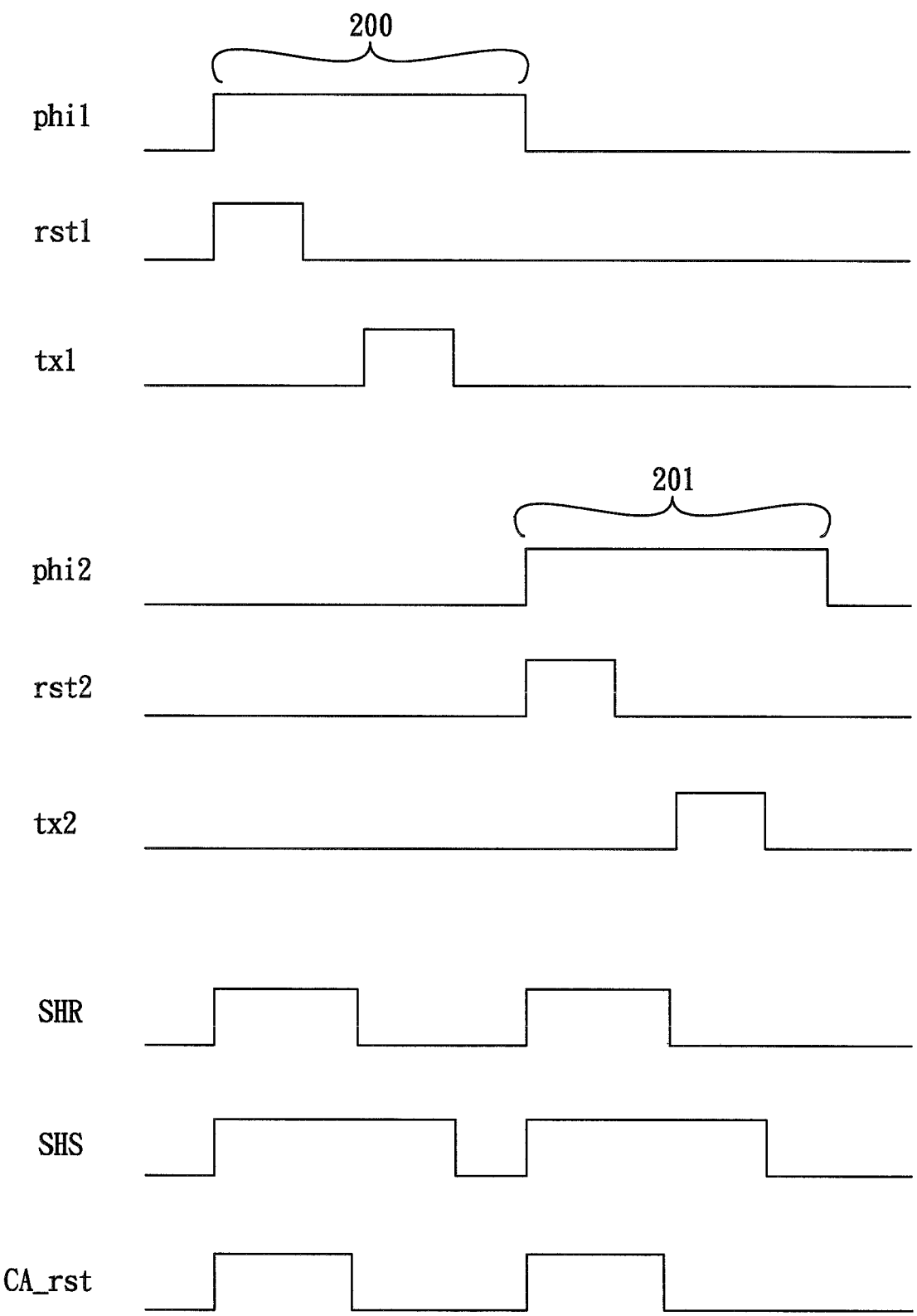
FIG. 6 shows a timing diagram of the corresponding signals in FIGS. 3, 4A and 4B in the normal operation mode.

FIG. 6 shows a timing diagram of the corresponding signals in FIGS. 3, 4A and 4B in the normal operation mode. In operation, first, the output of the pixel circuit for the first column (FIG. 4A) is connected to the readout architecture (FIG. 3) while the first switch phi1 is closed (200). The operation of the pixel circuit for the first column and the readout architecture during the period 200 is similar to that demonstrated in FIG. 5, and its description is thus omitted for brevity. Subsequently, the output of the pixel circuit for the second column (FIG. 4B) is connected to the readout architecture (FIG. 3) while the second switch phi2 is closed (201). The operation of the pixel circuit for the second column and the readout architecture during the period 201 is similar to that demonstrated in FIG. 5, and its description is also omitted for brevity.

Although specific embodiments have been illustrated and described, it will be appreciated by those skilled in the art that various modifications may be made without departing from the scope of the present invention, which is intended to be limited solely by the appended claims.

What is claimed is:

1. A readout circuit for an image sensor, comprising:
   at least one column amplifier (CA), which generates a CA reset signal when the column amplifier is reset;
   a capacitor and a switch configured to receive signal from column of the image sensor;
   a multiplexer coupled between (a) the capacitor and the switch and (b) an input of the column amplifier;
   a correlated double sampling (CDS) circuit for controllably receiving an output of the column amplifier, wherein the CDS circuit comprises;
   a sample-and-hold-reset signal (SHR) switch for sampling the CA reset signal:
   a SHR capacitor coupled to the SHR switch for holding the CA reset signal;
   a sample-and-hold-image signal (SHS) switch for sampling an image signal of the image sensor;
   a SHS capacitor coupled to the SHS switch for holding the image signal; and
   a switch network coupled between the CDS circuit and another amplifier other than the CA amplifier, wherein the switch network is configured such that outputs of the CDS circuit are controllably sent in sequence to the another amplifier.

2. The readout circuit of claim 1, wherein the capacitor is coupled to the column at one plate, and the switch is coupled between the second plate of the capacitor and an input of the multiplexer.

3. The readout circuit of claim 1, wherein the multiplexer is configured to add up image signals from a desired number of the columns.

4. The readout circuit of claim 1, wherein the multiplexer is configured to allow image signal from one single column at a time.

5. The readout circuit of claim 1, further comprising a feedback capacitor coupled between an output and the input of the column amplifier.

6. The readout circuit of claim 5, further comprising a CA-reset switch coupled between the output and the input of the column amplifier.

7. The readout circuit of claim 1, wherein the another amplifier is configured for receiving output of the CDS circuit.

8. The readout circuit of claim 1, wherein the amplifier includes a programmable gain amplifier (PGA).

9. The readout circuit of claim 1, wherein signals stored in the SHR capacitor are controllably sent in sequence, via the switch network, to one of two differential inputs of the amplifier, and signals stored in the SHS capacitor are controllably sent in sequence, via the switch network, to the other one of the two differential inputs of the amplifier.

10. A readout circuit for an image sensor, comprising:
   a column amplifier (CA), which generates a CA reset signal when the column amplifier is reset;
   a plurality of pairs each including a capacitor and a switch configured to receive signals from one of a plurality of columns of the image sensor respectively;
   a multiplexer coupled between (a) the capacitor and the switch pairs and (b) an input of the column amplifier;
   a correlated double sampling (CDS) circuit for controllably receiving an output of the column amplifier;
   a switch network configured to send outputs of the CDS circuit in sequence; and
   an amplifier coupled to receive outputs of the switch network;
   wherein the CDS circuit comprises:
      a sample-and-hold-reset signal (SHR) switch for sampling the CA reset signal;
      a SHR capacitor coupled to the SHR switch for holding the CA reset signal;
      a sample-and-hold-image signal (SHS) switch for sampling an image signal of the image sensor; and
      a SHS capacitor coupled to the SHS switch for holding the image signal;
   wherein signals stored in the SHR capacitor are controllably sent in sequence, via the switch network, to one of two differential inputs of the amplifier, and signals stored in the SHS capacitor are controllably sent in sequence, via the switch network, to the other one of the two differential inputs of the amplifier.

11. The readout circuit of claim 10, wherein the capacitor is coupled to the column at one plate, and the switch is coupled between the second plate of the capacitor and an input of the multiplexer.

12. The readout circuit of claim 10, wherein the multiplexer is configured to add up image signals from a desired number of the columns.

13. The readout circuit of claim 10, wherein the multiplexer is configured to allow image signal from one single column at a time.

14. The readout circuit of claim 10, further comprising a feedback capacitor coupled between an output and the input of the column amplifier.

15. The readout circuit of claim 14, further comprising a CA-reset switch coupled between the output and the input of the column amplifier.

16. The readout circuit of claim 10, wherein the amplifier includes a programmable gain amplifier (PGA).

* * * * *